June 19, 1962
A. M. WARN
3,039,423
SAFETY ALARM SIGNALS FOR VEHICLES
Filed Dec. 5, 1960
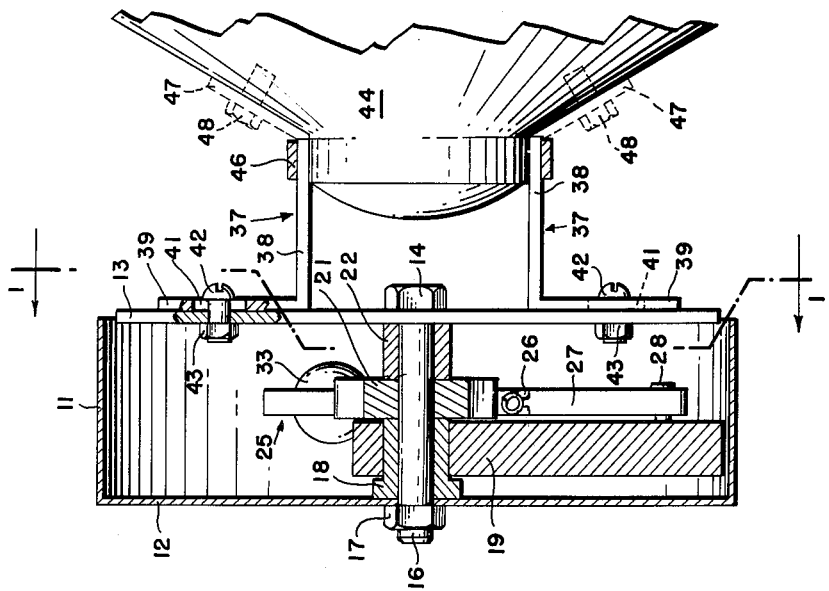
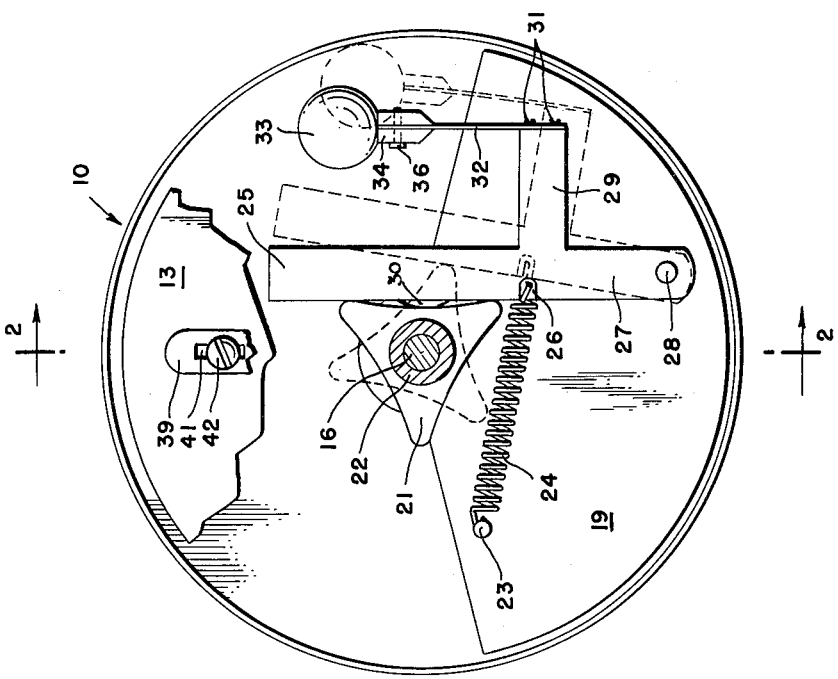
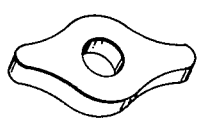
*INVENTOR.*
ARTHUR M. WARN
BY
*ATTORNEY*

3,039,423
SAFETY ALARM SIGNALS FOR VEHICLES
Arthur M. Warn, 18221 Pacific Highway S., Seattle, Wash.
Filed Dec. 5, 1960, Ser. No. 73,707
4 Claims. (Cl. 116—60)

This invention relates to new and useful safety signalling devices for vehicles.

The broad object of this invention is to provide a safety alarm for vehicles such as trucks, tractors, fork-lift trucks and the like, operated in areas in which there are people exposed to the danger of being struck by a vehicle. For example, loading and unloading docks and platforms, warehouses and stockrooms may require the use of such vehicles where people are likely to be moving about on foot. This device, attached to a vehicle wheel, will provide a warning to people nearby who may be engaged in other activity and whose attention may be diverted away from the danger of a nearby moving vehicle. Similarly, this device is designed to warn individuals whom the driver may have failed to see.

More specifically this invention has as its object to provide vehicles with a safety alarm signal which produces a continuous audible alarm regardless of the direction of travel of the vehicle.

Another object is the provision of a signalling device of the character described which is entirely self-contained, requiring no outside electrical, mechanical, hydraulic or other power or motive connections, and which, despite the fact that it contains movable parts, requires only a single rigid attachment to the vehicle structure. Generally the motive power is provided by the relative movement between certain parts which revolve with a wheel of the vehicle and certain other parts which are restrained against rotation by a counter- or pendulum- or eccentric-type weight.

Another object of this invention is to provide a safety alarm signal for vehicles which is simple and economical in construction, efficient and dependable in operation, and readily adaptable to any type of vehicle moving on wheels.

With these objects in view, as well as other objects which will appear in the course of the specification, reference may be had to the following drawings, wherein:

FIGURE 1 is a rear elevational view of the device taken along the line 1—1 of FIG. 2 in which the supporting plate is partially broken away to show the parts inside the bell;

FIGURE 2 is a side elevational view of the device taken along the line 2—2 in FIG. 1;

FIGURE 3 is an enlarged front elevational view in perspective of an alternate cam for the device, which cam is provided with only one lobe; and FIGURE 4 is an enlarged front elevational view in perspective of an alternative cam for the device, which cam is provided with two lobes.

Referring to the drawing in detail it will be seen that the embodiment of the invention illustrated comprises a sounding bell, generally designated by reference numeral 10, in the form of a shallow steel cylinder closed at one end and open at the other end. The bell 10 comprises circular end wall 12 having a flange or cylindrical side wall 11 around its edge. Bell 10 is apertured at its axis to be mounted on shaft 16 of bolt 14. Within bell 10 is a generally cylindrically shaped bushing 18 flanged at one end, as shown in FIG. 2, to space weight 19 from end wall 12. The cylindrical portion of bushing 18 slides over the shaft 16 as a sleeve and serves as a bearing for weight 19 which is pivotally mounted on shaft 16. Bushing 18 may be made of metal, lignum vita, nylon, Teflon or any other plastic or synthetic material suitable for use as a bearing. The cylindrical portion of bushing 18 is greater in length than weight 19 is thick so that besides being freely pivotal on the bushing the weight is also permitted a very limited amount of axial movement. Thus, where the device is operating the weight 19 will not bind and thus rotate, but will be restrained against rotation because of its mass being eccentrically disposed below shaft 16 by gravity.

Abutting bushing 18 is the interchangeable cam 21 which serves as the activating means for the striker bead which will be more fully discussed hereinafter. FIGS. 3 and 4 illustrate other cams which may be used with this device. It should be apparent that the cams may be provided with any number of lobes, but that with a simple follower mechanism such as is illustrated, the number of lobes should not as a practical matter be more than four or five. The cams, as with the bushing 18, may be made of a wide variety of materials such as hard wood, metal, plastic or other synthetic compositions which are non-resilient. Cam 21, of course, is apertured to be received on shaft 16.

Abutting cam 21 is a spacer sleeve 22 which is received on shaft 16. One end of sleeve 22 fits snugly against the cam while the other end abuts supporting plate 13 which is also apertured to be received on shaft 16. When nut 17 is tightened on shaft 16, bell 10, bushing 18, cam 21, sleeve 22 and supporting plate 13 is secured together as a single rigid unit.

Cam 21 is shown for illustrative purposes to have three lobes. Weight 19, made of heavy plate metal, is less than fully semi-circular in shape as can be seen in FIG. 1. Near the periphery of and spaced slightly away from the center line taken radially through weight 19 is small pivot shaft 28 extending outwardly from the face of said weight. Apertured at one end to be received on pivot shaft 28 is the follower mechanism generally indicated by reference numeral 25. The follower mechanisms 25 is comprised of a narrow bar 27 of somewhat less thickness than cam 21 and in length slightly greater than the radius of bell 10. Thus, mounted on pivot 28 the bar 27 extends upwardly to a point a short distance above the uppermost point of cam 21. Extending at right angles from bar 27 from a point off center and downwardly on the bar in the direction of the aperture in said bar is striker supporting arm 29 which is approximately one third the length of bar 27. Off center toward the upper extremity of bar 27 is the projection 30 the function of which is to engage cam 21. It could be noted that when a cam with relatively few lobes is used there is actually no need for projection 30. Hence, the cam would engage a straight sided follower. In any event the number of desired strikes of the bell during a single revolution would determine the number of cam lobes and the nature of the follower.

Spring 24 is provided to bias the bar 27 against cam 21. Spring 24 is anchored at one end by pin 23 and secured to bar 27 by inserting the other end of the spring through aperture 26. Flexible spring arm 32 is secured to rigid supporting arm 29 by screws 31. Arm 32, as seen in FIG. 1, extends upwardly parallel to bar 27. Said flexible arm 32 is shorter than its supporting arm 29. Striker or clapper head 33 is round. Depending from the head 33 and integrally formed therewith is base 34 which is to receive a spring arm 32 and which is rigidly fixed to said arm by screw or rivet 36.

The manner in which the invention is shown in FIG. 2. Supporting plate 13 is formed so as to be in radially spaced relation to the open end or edge of wall 11 and securely attached, as described above, to shaft 16 of bolt 14. In addition to its support function, and because it substantially covers the open end of the bell, plate 13 also serves to protect the operation of moving parts within bell 10 from being impared and obstructed with grease and dirt and other deleterious matter. Other methods, such as welding, are available to attach shaft 16 to plate 13.

In order to support the invention on the wheel hub 44 of the particular vehicle it is necessary to fashion three or four brackets, identical to brackets 37 shown for illustrative purposes, and spaced at either 90° or 120° intervals as may be determined necessary by a person skilled in the art. Brackets 37 have legs 38 and at right angles thereto legs 39. Legs 39 are provided with slots 41 for the purpose of permitting precise adjustment of the invention on the wheel hub 44. It should be noted that the axis of bell 10 and shaft 16 should be as nearly as possible coaxial with the axis of hub 44. Securing brackets 37 to the plate 13 are bolts 42 and nuts 43. Assembled as described this invention forms a rigid unit ready for attachment to the vehicle wheel hub.

Legs 38 may be secured to hub 44 by strapping said legs thereto with steel strap 46 having an appropriate tightening or cinching mechanism (not shown). Alternatively, the brackets 37 are shaped so that third legs, such as legs 47 shown in dotted lines, would fit the contour of the wheel to be attached thereto by the use of bolts or screws 48.

The operation of the safety alarm signal is the same regardless of the direction of travel of the vehicle. As this device rotates with the wheel, weight 19 retains a substantially stationary position below the shaft 16 due to gravity. Hence, the follower mechanism and striker are also restrained against rotation. The lobes of cam 21, however, in rotating with bell 10 move into contact with projection 31 and force the follower mechanism 25 away from the shaft and towards the side wall 11. Since striker head or clapper 33 is attached to the follower it, too, moves toward the side wall 11 and coming into contact with said side wall 11 produces the audible alarm signal. The number of alarm signals sounded in a single revolution is determined by the number of lobes on the particular cam employed.

It will be understood that the showing of the device is very diagrammatic and that the invention is capable of many refinements which will readily occur to those skilled in the art. In short this invention has application to most any type of body which rotates, the turning of which should be accompanied by a safety alarm signal. The intent, therefore, is to be limited only as indicated by the scope of the following claims.

What is claimed is:

1. A vehicular signal alarm for sounding a continuous audible warning of wheel rotation in either direction of wheel travel comprising:

(a) a shaft for coaxial rotation with a wheel;
   (b) a bell firmly mounted on said shaft for rotation therewith;
   (c) a weight pivotally mounted on said shaft within said bell and depending from said shaft in a relatively stationary position under the force of gravity;
   (d) a cam fixedly secured to said shaft for rotation therewith;
   (e) a cam follower means swingably mounted on said weight for engaging said cam; and
   (f) a striker head flexibly mounted on said cam follower means in striking relation to said bell whereby, when said cam rotates, said striker head is actuated through said cam follower means to strike said bell.

2. A vehicular signal alarm for sounding a continuous audible warning of wheel rotation in either direction of wheel travel, comprising:

(a) a shaft for coaxial rotation with a wheel;
   (b) a bell fixedly mounted on said shaft for rotation therewith;
   (c) a weight pivotally mounted on said shaft within said bell and depending from said shaft in a relatively stationary position under the force of gravity;
   (d) a cam fixedly secured to said shaft for rotation therewith;
   (e) a cam follower means swingably mounted on said weight and resiliently braced to press against a side of said cam; and
   (f) a striker head flexibly mounted on said cam follower means in striking relation to said bell whereby, when said cam rotates, said striker head is actuated through said cam follower means to strike said bell.

3. A vehicular signal alarm for sounding a continuous audible warning of wheel rotation in either direction of wheel travel, comprising:

(a) a shaft for coaxial rotation with a wheel;
   (b) a bell fixedly mounted on said shaft for rotation therewith;
   (c) a weight pivotally mounted on said shaft within said bell and depending from said shaft in a relatively stationary position under the force of gravity;
   (d) a cam fixedly secured to said shaft for rotation therewith;
   (e) a cam follower means swingably mounted on said weight and extending upwardly beside and above said cam;
   (f) a resilient means biasing said follower means to press against said cam; and
   (g) a striker head flexibly mounted on said follower means in striking relation to said bell whereby when said cam rotates said striker head is actuated through said follower means to strike said bell.

4. A vehicular signal alarm according to the structure of claim 3 and comprising in addition thereto:

(h) a supporting plate fixedly secured to said shaft to substantially close the open end of said bell and which is adapted to support the claimed structure on a vehicle wheel.

References Cited in the file of this patent

UNITED STATES PATENTS

| | | |
|---|---|---|
| 1,232,549 | Hoover | July 10, 1917 |
| 2,802,441 | Epstein | Aug. 13, 1957 |

FOREIGN PATENTS

| | | |
|---|---|---|
| 181,129 | Great Britain | June 12, 1922 |